May 19, 1931. W. A. EDWARDS 1,806,153
RADIATOR SHUTTER CONTROL FOR CONSERVING HEAT
Filed July 26, 1928
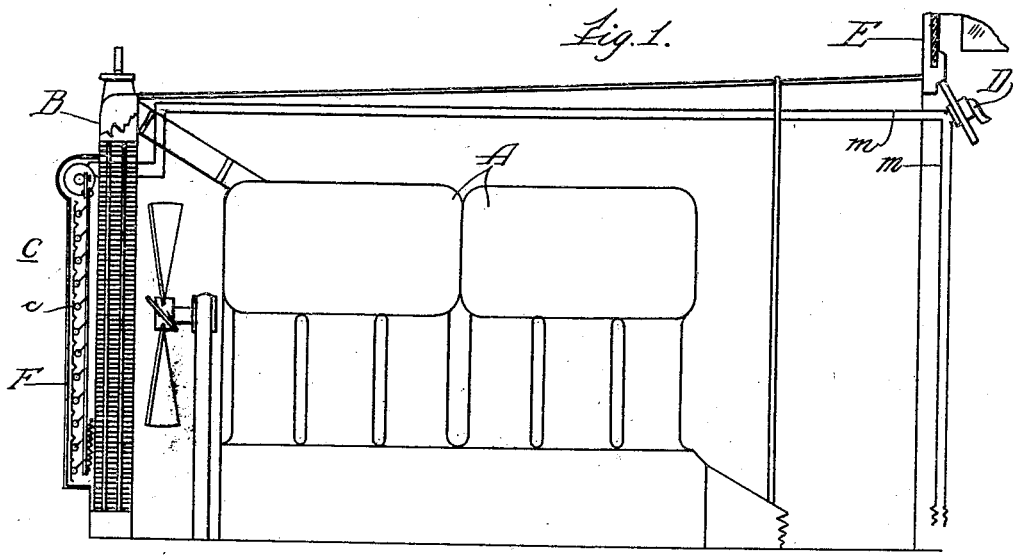
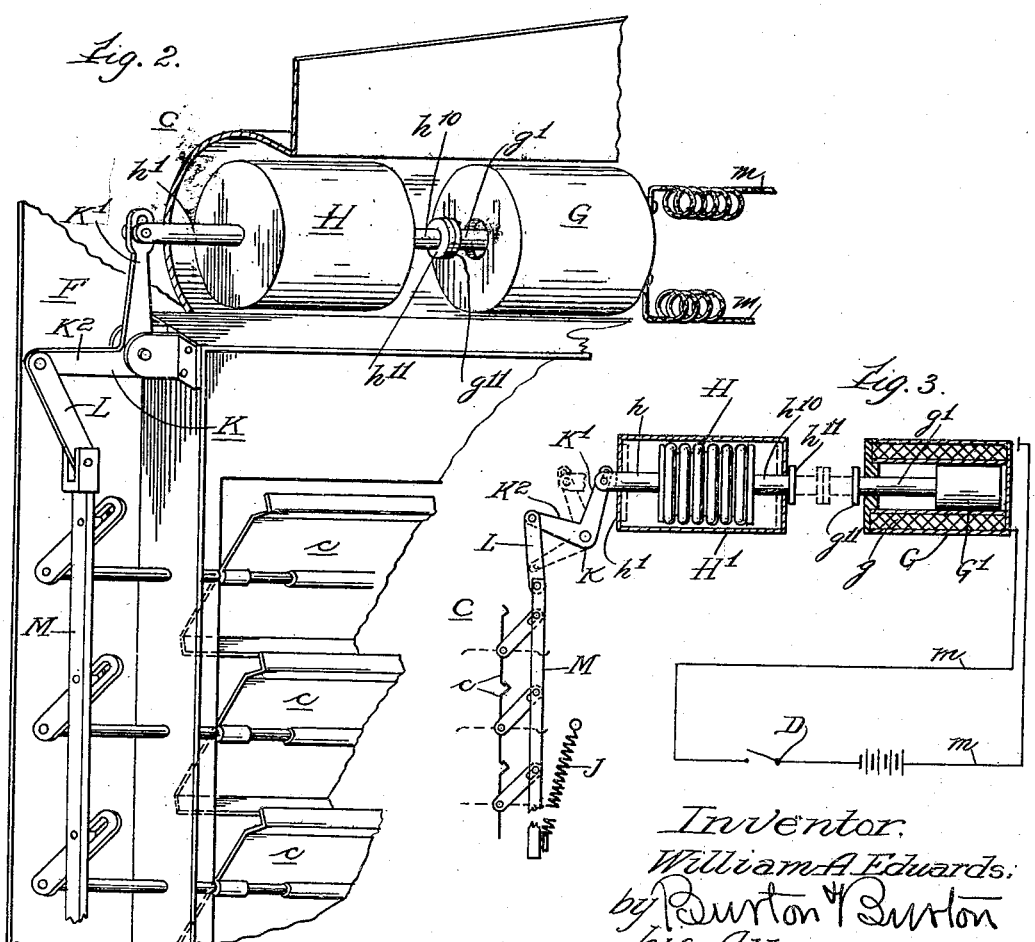
Inventor.
William A. Edwards.
by Burton & Burton
his Attorneys.

Patented May 19, 1931

1,806,153

UNITED STATES PATENT OFFICE

WILLIAM A. EDWARDS, OF CHICAGO, ILLINOIS

RADIATOR SHUTTER CONTROL FOR CONSERVING HEAT

Application filed July 26, 1928. Serial No. 295,493.

The purpose of this invention is to provide an improved construction for controlling the air circulation about an automobile engine radiator for preventing undue cooling and waste of heat in the extreme winter weather. It consists in the elements and features of construction shown and described as indicated in the claims.

In the drawings:—

Figure 1 is a somewhat diagrammatic view in the nature of a side elevation of an engine on an automobile equipped with this invention for showing the relative positions on the engine and vehicle of the co-operating parts concerned in the invention.

Figure 2 is a perspective view of a part of the radiator with whose shutter the parts constituting the invention are associated for the purposes of the invention.

Figure 3 is a diagrammatic view of the nature of a wiring diagram for indicating the relative positions of a temperature-responsive device and a solenoid which co-operate for the purpose of the invention.

In the drawings, A indicates the engine body, B, the radiator casing, and C the shutter system of the radiator in its entirety. The ignition switch of the engine is indicated at D in a customary position relative to the windshield which is indicated at E. At any desired or convenient position, as at the forward side of the radiator, behind the shield, F, in which the shutter vanes, $c$, are mounted for controlling the shield aperture, there is mounted a solenoid, G, whose windings, $g$, are contained in the ignition circuit, $m, m$, of the engine, as indicated in the diagram Figure 3. The movable core, $G^1$, of the solenoid is arranged for operating the radiator shutter system in opposition to the spring, J, by which the shutter vanes are normally held at closed position, the connection for this operation comprising a temperature-responsive device, H, of bellows form contained in the casing, $H^1$, which is mounted on the radiator casing in alignment with the solenoid, G, said temperature-responsive element, H, having a stem or operating rod, $h$, which is guided in the head, $h^1$, of the casing, $H^1$, through which said stem extends for being pivotally connected to the upstanding arm, $K^1$, of the bell crank lever, K, which is fulcrumed on the radiator casing having a horizontal arm, $K^2$, connected by a link, L, with the operating rod, M, of the shutter vanes. The horizontal operating rod, $h$, of the temperature-responsive device, H, is dimensioned in view of the position at which the casing, $H^1$, is mounted on the radiator casing for positioning the temperature-responsive device, H, intermediate the ends of the casing, $H^1$, at the normal position at which said device is held by the shutter operating spring, J, at closed position of the shutter vanes. And said device has a second stem, $h^{10}$, extending out through the opposite end of the casing, $h^1$, and obtaining guidance therein, said stem, $h^{10}$, having at the end outside the casing a disk head, $h^{11}$, for co-operating as a stop with a similar stop disk, $g^{11}$, with which the protruding stem, $g^1$, of the solenoid core, $G^1$, is provided.

The thermostatic device and its casing and the solenoid are relatively dimensioned and spaced from each other so that at the position of all of said parts when the engine is cold, the radiator shutter closed by its spring and the ignition circuit open so that the engine is not running, and the solenoid winding unenergized and the core being at withdrawn position within the solenoid windings, the temperature-responsive device, $H^1$, is that an intermediate position in the length of the casing, H, and the disks, $h^{11}$ and $g^{11}$ are spaced apart a substantial distance, as seen at full line position of said elements in Figure 3. And the parts are dimensioned to adapt the heat-responsive device by its expansion which may result only from a dangerously high temperature of the radiator, to thrust the stem, $h^{10}$, rearward and carry the terminal disk, $h^{11}$, toward the terminal disk, $g^{11}$, of the solenoid core stem such a distance that upon the closing of the ignition circuit for starting the engine, after interruption of previous running during which the radiator may have become thus highly heated, the solenoid winding being energized, the resulting movement of the solenoid core will thrust the stem $g^1$, forward, carrying the terminal disk, $g^{11}$, toward and into encounter with the disk, $h^{11}$, of the sylphon stem.

If the temperature of the radiator becomes such as to make it necessary for safety to open the shutter for admitting the atmosphere to cool the radiator, the distance to which the stem, $h^{10}$, and disk, $h^{11}$, will be thrust rearward by the temperature-responsive device will be such that the encounter therewith of the disk, $g^{11}$, on the solenoid stem will operate for thrusting the entire device, H, bodily in the casing forward a sufficient distance to operate the bell crank lever, K, in a direction to open the shutter vanes, it being understood that the solenoid will be constructed and dimensioned so that when energized in the ignition circuit, the core will be thrust forward, as indicated, with sufficient force to overcome the spring, J, which holds the shutters normally closed, and that the heat-responsive sylphon will be dimensioned so that when expanded by the temperature, it will be adequate to transmit the thrust of the solenoid core in opposition to the spring, J, for affecting the opening of the shutters as described.

If, on the other hand, the temperature of the radiator has not become dangerously high by the operation of the engine during running and travel of the car, so that it is not necessary to open the shutter when the car stops to obtain the necessary air circulation or direct free radiation of heat from the radiator in view of the loss of cooling value of the air movement due to travel of the car, the construction is designed so that the distance the stem $h^{10}$, and the disk, $h^{11}$, will have been thrust rearward by the expansion of the device, H, will not be sufficient to cause encounter of the disk, $h^{11}$, with the disk, $g^{11}$, of the solenoid stem at the withdrawn position of the latter due to operating the ignition switch for opening the ignition circuit; and accordingly, instead of the radiator shutters being opened when the car stops, if they have been opened during the running of the car, they will be closed as the result of the retraction of the solenoid core and disk, $g^{11}$, out of encounter with the disk, $h^{11}$, notwithstanding the latter has been thrust rearward in the direction for encounter with the solenoid core disk by the action of the thermostatic device due to the engine temperature which has resulted from running of the engine during travel of the car.

The reason for thus dimensioning and arranging the parts is that the primary intention of the invention is to conserve heat and energy, and only incidentally to cause the cooling of the radiator for preventing overheating of the engine; and it will be understood from the foregoing that the parts described are positioned and adjusted so that when the engine is cold, as at starting, although the closing of the ignition circuit for starting the engine will cause the solenoid core to be thrust forward to the full limit of its stroke, no effect will be thereby produced upon the shutter which will remain closed and will be opened only when the expansion of the temperature-responsive device has thrust the stem, $h^{10}$, of the said device rearwardly into contact with its disk, $h^{11}$, with the disk, $g^{11}$, of the solenoid stem which already stands thrust forward to its limit.

And on the other hand it will be understood the parts may be proportioned and adjusted that when the engine is so hot, that the radiator heat causes the expansion of the sylphon temperature-responsive device to the limit of the casing or of the expansibility of the temperature-responsive device if the ignition circuit is open, so that the engine is not running, no effect will be produced upon the shutters by the expansion of the said device and, on the contrary, the control of the shutter for controlling the temperature of the radiator will await the closing of the ignition circuit for starting the engine; and whether the temperature responsive element at maximum expansion brings the disk, $h^{11}$, into contact with the disk, $g^{11}$, at withdrawn position, due to open ignition circuit, so as to open the shutter under those conditions, will depend upon the selection of position for mounting the temperature-responsive device relatively to the solenoid on the engine.

I claim:

1. In combination with an internal combustion engine having a circulatory cooling system and a radiator front provided with a shutter and connections for operating the same, a solenoid having its moving core member arranged for co-operating with the shutter-operating connections in the movement of said core resulting from energizing the solenoid, the solenoid winding being connected in an electric circuit of the engine, a temperature-responsive element comprised in said connections, said element being mounted in position for being substantially affected by the temperature of the circulatory cooling liquid.

2. In combination with an internal combustion engine having a radiator front provided with a shutter and mechanical connections for operating the same, a solenoid having its moving core member arranged for co-operating with said shutter-operating connections in the movement of said core resulting from energizing the solenoid, the solenoid winding being connected in an electric circuit of the engine, a temperature-responsive element comprised in said connections, said element being mounted outside the radiator at the side thereof remote from the engine.

3. In the construction defined in claim 1, the temperature-responsive device comprising a part which is movable by the action of said device responsive to temperature change, into and out of position for completing the operating mechanical connection of the solenoid with the shutter.

4. In combination with an internal combustion engine having a circulatory cooling system and a radiator front provided with a shutter and mechanical connections for operating the same, a solenoid having its moving core member arranged for co-operating with said shutter-operating connections in the movement of said core resulting from energizing the solenoid, the solenoid winding being connected in an electric circuit of the engine, said connections comprising a part mounted and connected for movement into and out of position for encounter by the movable element of the solenoid when the latter is energized, a temperature-responsive device by whose member movable in temperature-responsive change said part is carried, said temperature-responsive device being mounted for responding by movement of said part to the temperature of the radiator.

5. In combination with an internal combustion engine having a circulatory cooling system and a radiator front provided with a shutter and mechanical connections for operating the same, a solenoid having its moving core member arranged for co-operating with said shutter-operating connections in the movement of said core resulting from energizing the solenoid, the solenoid winding being connected in an electric circuit of the engine, said connections comprising a temperature-responsive device mounted for responding to change of temperature of the radiator comprising a part movable by said changes of temperature, said temperature responding device being mounted for interposing said movable part in the operating connections of the solenoid to the radiator shutter for transmitting the movement of the solenoid core to the shutter.

6. In combination with an internal combustion engine having a circulatory cooling system and a radiator front provided with a shutter and mechanical connections for operating the same, a solenoid having its moving core member arranged for co-operating with said shutter-operating connections in the movement of said core resulting from energizing the solenoid, the solenoid winding being connected in an electric circuit of the engine, said connections comprising an interposable part which is movable into and out of movement-transmitting relation to said connections, the temperature-responsive device being mounted for response to changes of temperature of the radiator, said interposable member being carried by the movement of part of the temperature-responsive device which is movable in response to temperature change.

7. In a construction for the purpose indicated, in combination with an internal combustion engine having a circulatory cooling system and a radiator therein provided with a shutter, means for operating said shutter for varying the access of air to the radiator comprising a solenoid having its circuit windings comprised in the ignition circuit of the engine and its movable core member constituting part of operating connections to the shutter, another part of said operating connections consisting of a temperature-responsive device mounted for responding to the changes of temperature of the radiator and having the part thereof which moves in response to said temperature changes positioned for moving into and out of movement-communicating position and in the operating connections to the shutter.

8. In combination with an internal combustion engine having a circulatory cooling system and a radiator therein provided with a shutter, operating connections for the shutter comprising a temperature-responsive device mounted for responding to changes in temperature of the radiator, and means co-operating with the movable element of said temperature-responsive device comprising a solenoid having its windings contained in the ignition circuit of the engine, said solenoid being mounted for positioning its movable core member for its movement due to the energizing of the solenoid windings in position for co-operating with the movable element of the temperature-responsive device to complete the shutter-operating connections.

In testimony whereof, I have hereunto set my hand at Chicago, Illinois, this 20th day of July, 1928.

WILLIAM A. EDWARDS.